Jan. 12, 1971    P. L. WATKINS ET AL    3,555,549
RADAR RANGE INDICATING SYSTEM

Filed July 17, 1968    9 Sheets-Sheet 1

NOTE: TIME SCALE FOR 3a, 3b, AND 3c IS
DIFFERENT THAN FOR PULSES A, B, C AND D.

INVENTORS
PHILLIP L. WATKINS
FRANK D. CLARKE

BY James D Murray
ATTORNEYS

|  | COUNT | COUNTING STAGES | | | | STORAGE FLIP-FLOPS | | | |
|---|---|---|---|---|---|---|---|---|---|
|  |  | 74 | 76 | 78 | 80 | 82 | 84 | 86 | 88 |
| BINARY MODE | 1 | X | O | O | O | X | O | O | O |
|  | 2 | O | X | O | O | O | X | O | O |
|  | 3 | X | X | O | O | X | X | O | O |
|  | 4 | O | O | X | O | O | O | X | O |
|  | 5 | X | O | X | O | X | O | X | O |
|  | 6 | O | X | X | O | O | X | X | O |
|  | 7 | X | X | X | O | X | X | X | O |
|  | 8 | O | O | O | X | O | O | O | X |
|  | 9 | X | O | O | X | X | O | O | X |
|  | 10 | O | X | O | X | O | X | O | X |
|  | 11 | X | X | O | X | X | X | O | X |
|  | 12 | O | O | X | X | O | O | X | X |
|  | 13 | X | O | X | X | X | O | X | X |
|  | 14 | O | X | X | X | O | X | X | X |
|  | 15 | X | X | X | X | X | X | X | X |
|  | 16 | O | O | O | O→ | O | O | O | O |
| BCD MODE | 1 | X | O | O | O | X | O | O | O |
|  | 2 | O | X | O | O | O | X | O | O |
|  | 3 | X | X | O | O | X | X | O | O |
|  | 4 | O | O | X | O | O | O | X | O |
|  | 5 | X | O | X | O | X | O | X | O |
|  | 6 | O | X | X | O | O | X | X | O |
|  | 7 | X | X | X | O | X | X | X | O |
|  | 8 | O | X | X | X | O | O | O | X |
|  | 9 | X | X | X | X | X | O | O | X |
|  | 10 | O | O | O | O→ | O | O | O | O |

INVENTORS
PHILLIP L. WATKINS
FRANK D. CLARKE

BY *James D Murray*
*R Shearer* ATTORNEYS

United States Patent Office 3,555,549
Patented Jan. 12, 1971

3,555,549
RADAR RANGE INDICATING SYSTEM
Phillip L. Watkins, Rockville, and Frank D. Clarke, Camp Springs, Md., assignors to the United States of America as represented by the Secretary of the Navy
Filed July 17, 1968, Ser. No. 745,632
Int. Cl. G01f 5/02; G01s 9/06
U.S. Cl. 343—13                                25 Claims

ABSTRACT OF THE DISCLOSURE

A radar range measuring system obtains target range by utilizing a digital counter which counts the cycles of a high frequency stable oscillator. The counter comprises a series of counting stages interconnected to a series of storage stages by a plurality of AND gates. The counter ouptut indicates range in either a binary code or binary codded decimals in accordance with the position of a mode control switch which is connected to the AND gates.

The invention described herein may be manufactured and used by or for the Government of the United States of America for governmental purposes without the payment of any royalties thereon or therefor.

SUMARY OF INVENTION

In the field of radar, a constant effort has been made to improve the subsystems which provide the usable data. In modern radar system, computers and digital data storage and display systems have largely replaced the operator's eye and voice and the cathode ray tube display that were used in the early radar sets.

Many of these modern systems obtain extended range indications in a manner which causes the accuracy of the indication to be related to the stability of the pulse repetition frequently (PRF). Since the PRF is not ordinarily highly stable, the extended range indications of many modern radars is less accurate than desirable. Also, the utility of many modern radars is limited because the data output is either in binary code, which is useful primarily with computers, or binary coded decimals, which is useful primarily with commercially available plotting and readout system.

The present invention relates to a time measuring system and more particularly to a time measuring system which is suited for use with radar to provide a highly accurate, digital indication of target range in either binary code or in binary coded decimals. Specifically, the present invention utilizes a very stable, high frequency oscillator to energize a gated counter and provide a range indication which has an incremental accuracy that is related to both the stability of the oscillator and to the reciprocal of the oscillator frequency. Further, by the use of unique data processing circuitry, the digital range indication can be selected to be either in binary code or in binary coded decimals.

It is, therefore, the broad object of the present invention to provide an improved time measuring system which is particularly useful with radar.

Another broad object of the invention is the provision of an improved data processing system which selectably provides a count indication either in binary code or in binary coded decimals.

Still another object of the present invention is to provide a multi-mode radar range measuring system that is energized by a very stable oscillator and which has the capability for allowing test or normal operation, normal or extended range operation, control of data use and display either by radar set internally generated signals or by the data utilizing system and digital range indication either in binary code or in binary coded decimals.

Other objects and features of the invention will become apparent to those skilled in the art as the disclosure is made in the following description of a preferred embodiment of the invention as illustrated in the accompanying drawings in which:

DETAILED DESCRIPTION OF INVENTION

Although the present invention was specifically developed by the Naval Research Laboratory, Washington, D.C., for use with the 150-ft.-diameter steerable antenna Randle Cliff Radar and is described herein as being used in radar, it will be apparent that the invention has a much wider utility. In its broader aspects, the present, basically time-measuring, invention could obviously be used in sonar and also in such diverse horological purposes as precisely measuring the time between the spark and peak pressure in a reciprocating (piston) aircraft engine. Similarly, the unique data processing circuits of the present invention have an evident utility in any environment wherein it is desirable to have a simple count available in binary code or in binary coded decimal form.

Figure 1:
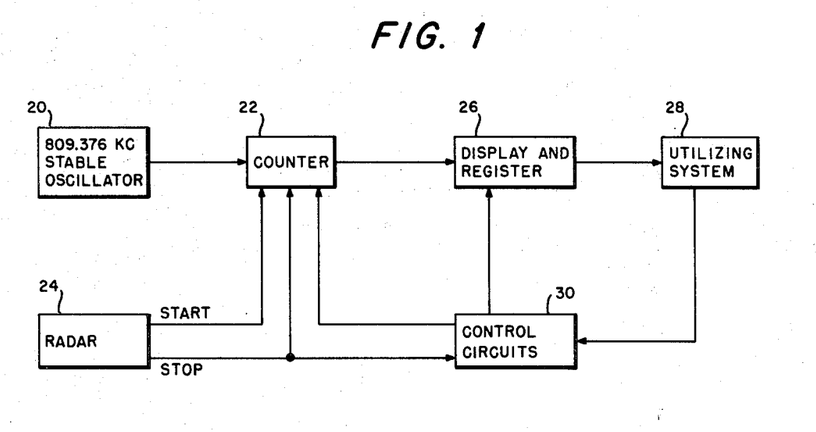
FIG. 1 illustrates the basic aspects of the invention.

Referring now to the drawings, wherein like reference characters designate like or corresponding parts throughout the several views, there is shown in FIG. 1 (which illustrates the invention in basic block diagram form) a highly stable oscillator 20 which operates at frequency of 809.376 kc., a frequency chosen because of its relationship to the propagation velocity of electromagnetic energy in nautical miles. Oscillator 20 energizes a counter 22 which is controlled to count the signals from oscillator 20 by start and stop signals that usually originate in radar 24. Transfer of this count from display and register means 26 and to a utilizing system 28 is accomplished by signals from control circuits 30 which are in turn energized by signals from the radar 24 or from the utilizing system 28.

A suitable system for use as the utilizing system 28 is described in Naval Research Laboratory (NRL) Report 6584, "A Digital Magnetic Tape System for Recording Radar Data," by P. L. Watkins, J. M. Goodman and A. M. Knopp. It is also contemplated that Utilizing System 28 can be a commercially available computer or a commercially available plotting and readout system. Readers desiring further information about the present invention may consult NRL Report 6572 "The Randle Cliff Radar Digital Range-Measuring Instrument" by P. L. Watkins and F. D. Clarke.

CONTROL OF COUNTER

Figure 2A:
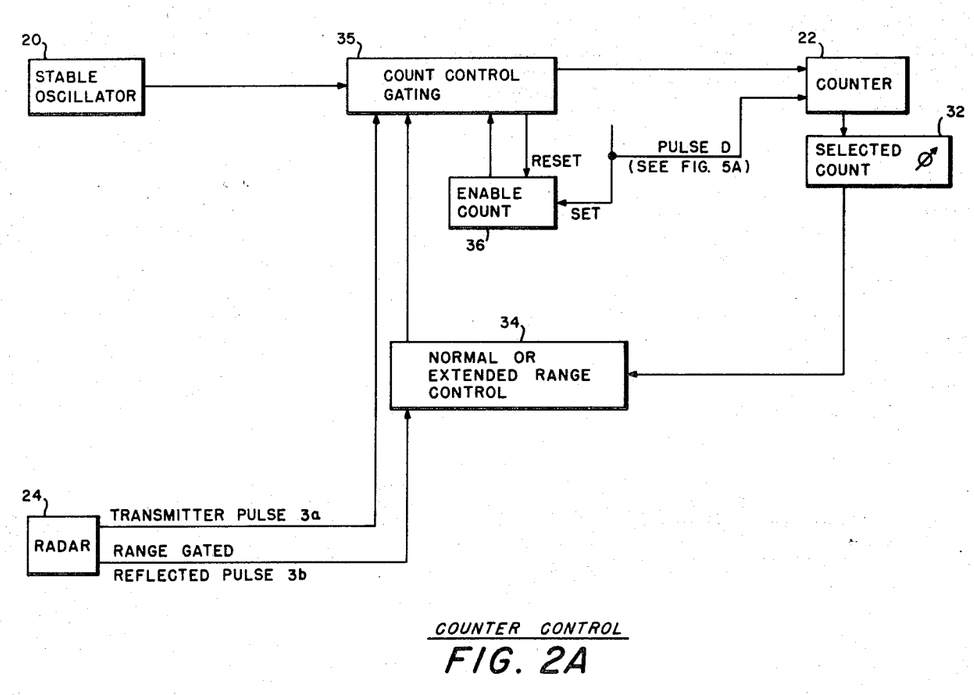
FIGS. 2A and 2B show the invention in functional block diagram form.
Figure 4A:
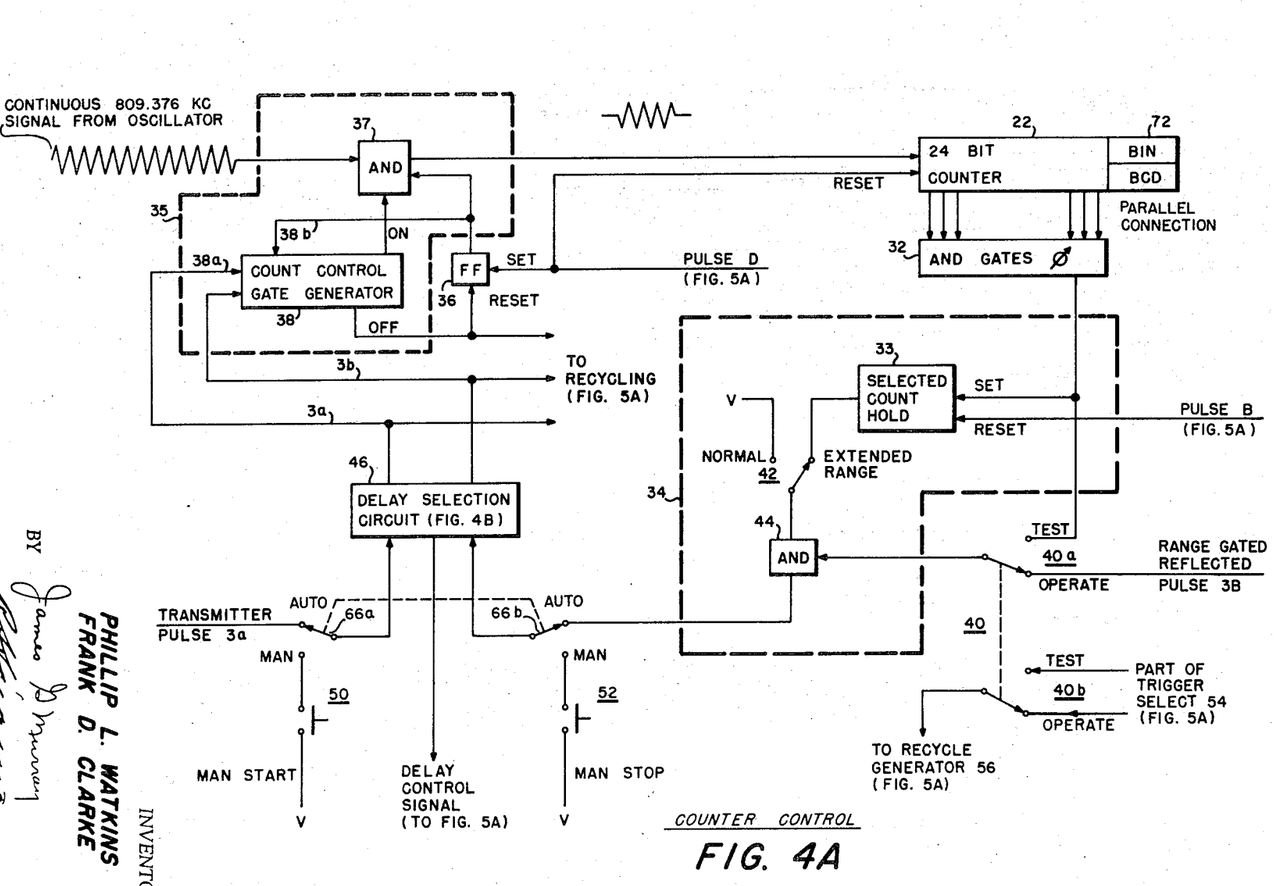
FIGS. 4A, 4B, 5A and 5B illustrate circuits which are suitable for use in the functional block diagram of FIGS. 2A and 2B.
Figure 4B:
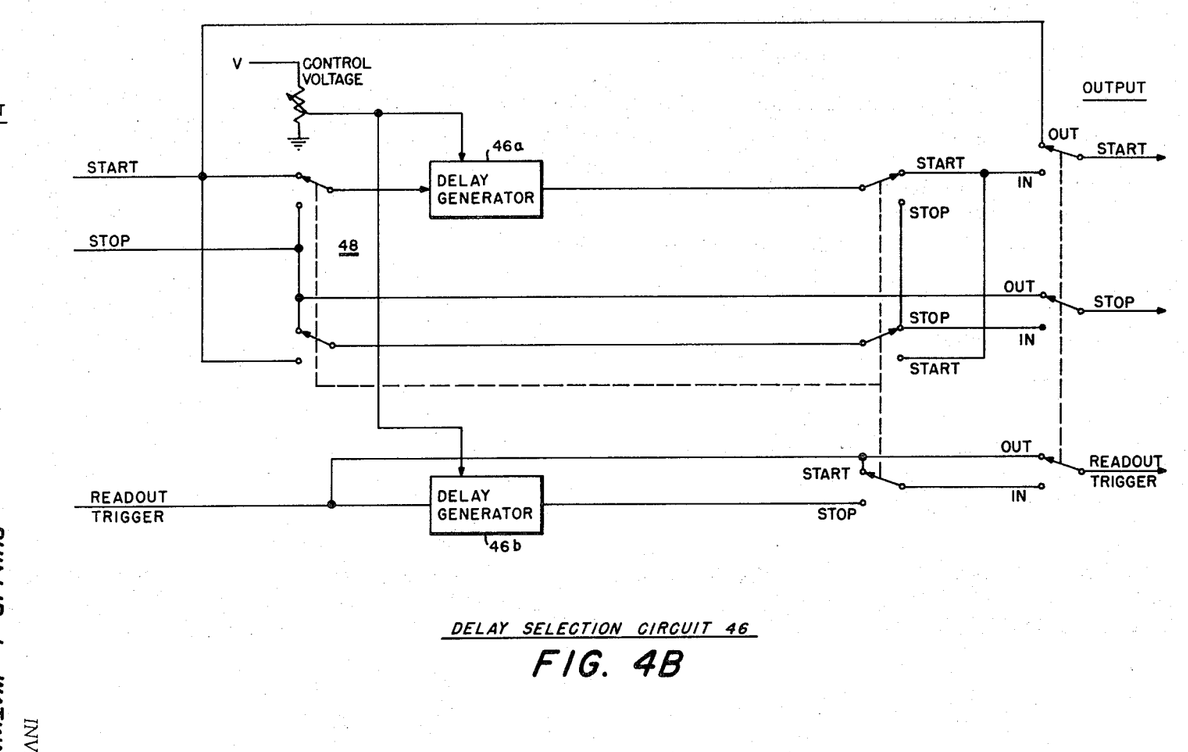

FIG. 1 is, of course, a greatly simplified illustration of the invention which is shown in greater detail in the other drawings. FIGS. 2A, 4A and 4B are functional block and circuit diagrams which better show the aspects of the invention relating to the control of counter 22.

As previously described, two signals which originate in radar 24 are basically used to control counter 22. The first of these signals 3a, is either coincident with or time related to the radar transmitter pulse and occurs at the pulse repetition frequency (PRF). The second of these signals 3b is also at the PRF and is either coincident with or time related to the reflected target pulse and is often easily obtained from the video range gate signal.

Figure 3:
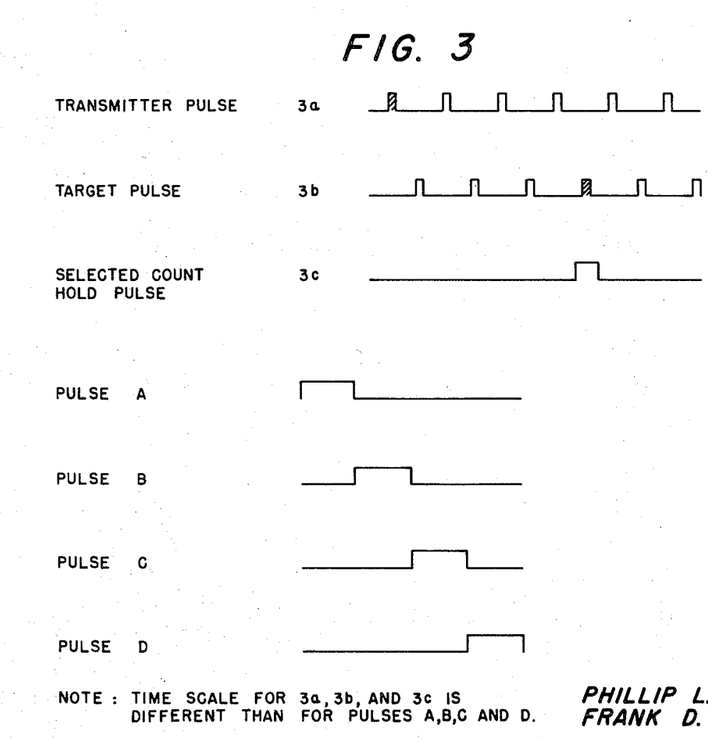
FIG. 3 is a timing diagram which is helpful in understanding the invention.

When the time required for the transmitted pulse to travel to the target and return to the radar is greater than the time between transmitted pulses, it will be evident from the wave forms 3a and 3b in FIG. 3 that the time relationship between these pulses is ambiguously indicative of target range. For purposes of illustration, the shaded fourth target pulse is defined as resulting from the shaded first transmitter pulse. To remove this source of ambiguity, a Selected Count unit 32 is connected to and controlled by counter 22 and functions to gate the Normal-Extended Range Control 34 so that this control passes only the reflected pulses associated with the range of the target being investigated. The pulse selectively passed by Normal-Extended Range Control 34 is connected to close Count Control Gating unit 35. Unit 35 had previously been opened to pass the signal from stable oscillator 20 to counter 22 as a result of Pulse D (from a sequencing unit to be described later) which caused the Enable Count unit 36 to enable the Count Control Gating unit 35 to accept a transmitter pulse 3a and become opened. Pulse D is also used to reset counter 22.

FIG. 4A shows some of the circuit details which are suitable for use in the functional block diagram of FIG. 2A. The continuous 809.376 kc. signal from stable oscillator 20 is gated through AND gate 37 by the "ON" state of Count Control Gate Generator 38, typically a flip-flop circuit, which is triggered only when a DC bias signal precedes and is present together with an AC trigger signal. Gate 37 and circuit 38 together comprises unit 35 of FIG. 2A. The operation of Gating unit 35 is later described in more detail.

Counter 22, which typically can have a 24 bit capacity, is reset by a signal derived from Pulse D from the sequencing unit and is pulsed by the gated 809.376 kc. output signal from gate 37. The counter is also connected by 24 parallel output leads to Selected Count unit 32. This unit typically contains 24 AND gates that may be selectably set to a number relating to the minimum expected range of the target under consideration and which, when matched by the bit information counter 22, produces a pulse output that is connected to the "a" section of switch 40 and to the "set" terminal of Select Count Hold unit 33 which may be "a" flip-flop holding circuit. For purposes of testing, and as will be explained later, switch 40 may connect the pulse output of AND gates 32 directly to one input of AND gate 44 which together with Hold unit 33 is included in the Normal or Extended Range Control unit 34 (FIG. 2a). Normally, however, the switch 40 is in the "operate" position and connects range gate pulses 3b from the radar 24 to AND gate 44, the other input of which is selected by switch 42. This switch is also included in the Normal-Extended Range Control 34. If the target under investigation is so close that the extended range feature of this invention is not required, switch 42 is connected by "normal" mode terminal to a constant source of voltage which causes gate 44 to pass all range gate pulses 3b. When switch 42 is in the "extended range" position, the AND gate 44 will pass only the first range gate pulse 3b following the turn-on of the Selected Count Hold flip-flop 33 by the pulse from AND gate 32. In other words, the pulse 3b passed by AND gate 44 when pulse 3c (FIG. 3) from flip-flop 33 is present, will be from a target beyond the minimum range selected by the setting of AND gates 32. Selected Count Hold unit 33 is reset by Pulse B from the sequencing unit which will be described later.

Turn-on of Count Control flip-flop 38, which is required to pass the 809.376 kc. pulses from stable oscillator 20 through the counter input AND gate 37 is accomplished by the potentials applied to the terminals 38a and 38b. The Enable Count unit 36 is typically in the form of a bistable multivibrator or "flip-flop" which is switched "on," to provide a DC enabling level to terminal 38b of flip-flop 38, by the Pulse D from the sequencing unit. The next transmitter pulse 3a, when applied to terminal 38a, causes generator 38 to turn on and allow AND gate 37 to pass the 809.376 kc. signal from stable oscillator 20 to the counter 22. The DC enabling signal from flip-flop 36 is also required by AND gate 37 to pass the ocillator signal to the counter 22. This will continue until the generator 38 is turned "off" by the range gate pulse 3b selected in a manner previously described. When flip-flop 38 turns "off," the enable count flip-flop 36 is reset and the recycling portion of the invention is energized, as will be explained later. Flip-flop 36 will remain in the "off" state unit turned "on" by Pulse D.

For purposes of calibration, it is convenient to include a selectable signal delay unit 46 in the control leads of Count Control Gate Generator 38 and for certain internal test purposes it is convenient to include switches 50 and 52 which are inoperative in the "Automatic" mode position of switch 66 and when used in the "Manual" mode allow "start" and "stop" count signals to be generated as desired by the momentary closing of switches connected to constant sources of potential.

The configuration of the delay switching circuitry 46, shown in FIG. 4b allows the operator to adjust the desired delay while the unit is in the Test mode, and the selector switch 48 is in the Stop position. It is recalled that the stop pulse is internally generated when the invention is in the Test mode. Once the delay generator 46a is properly adjusted, it may be selectably inserted into either the Start or Stop count trigger line to effect a negative or positive correction when the invention is switched back to the Operate mode wherein both start and stop triggers are generated by the radar 24. A dual control voltage is used to allow a second delay generator 46b to track the first delay generator 46a. This second delay generator 46b is used in the external data readout trigger line in the count recycle and readout portion of the invention.

To briefly summarize, it is by now apparent that there has been disclosed the counter control portion of the present invention wherein an indication of target range is obtained in the form of the counted number of oscillator cycles passed by a gate controlled by the radar transmitter and range gate reflected pulses. The target may be either near or at a great distance and the accuracy of the target range indication is independent of variations in the radar set pulse repetition frequency and is instead based on the stability of a stable oscillator. Also, in addition to the operational modes, provisions have been included for various modes of testing, and the insertion of calibration delays in both operational and test modes.

RECYCLING AND READOUT

Figure 2B:
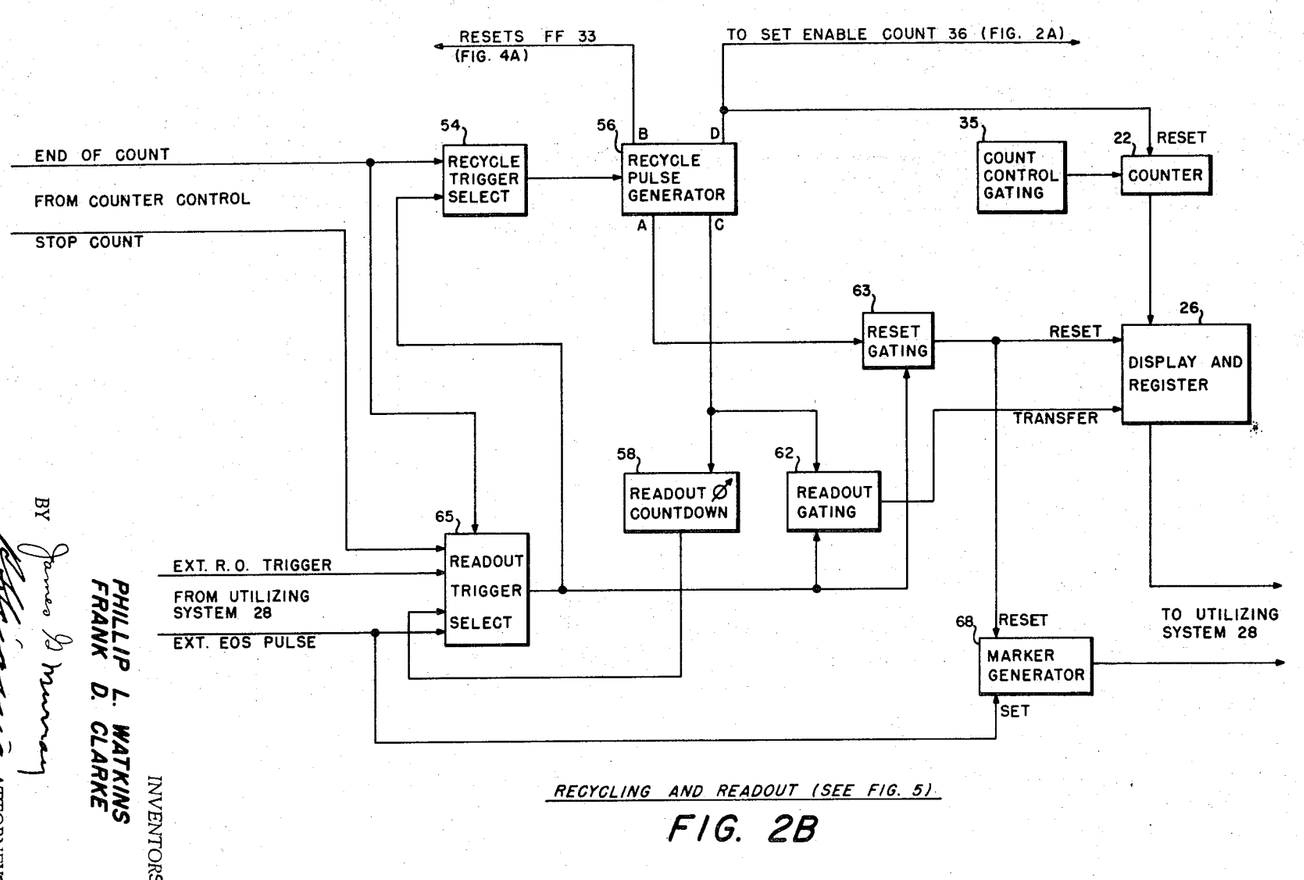
Figure 5A:
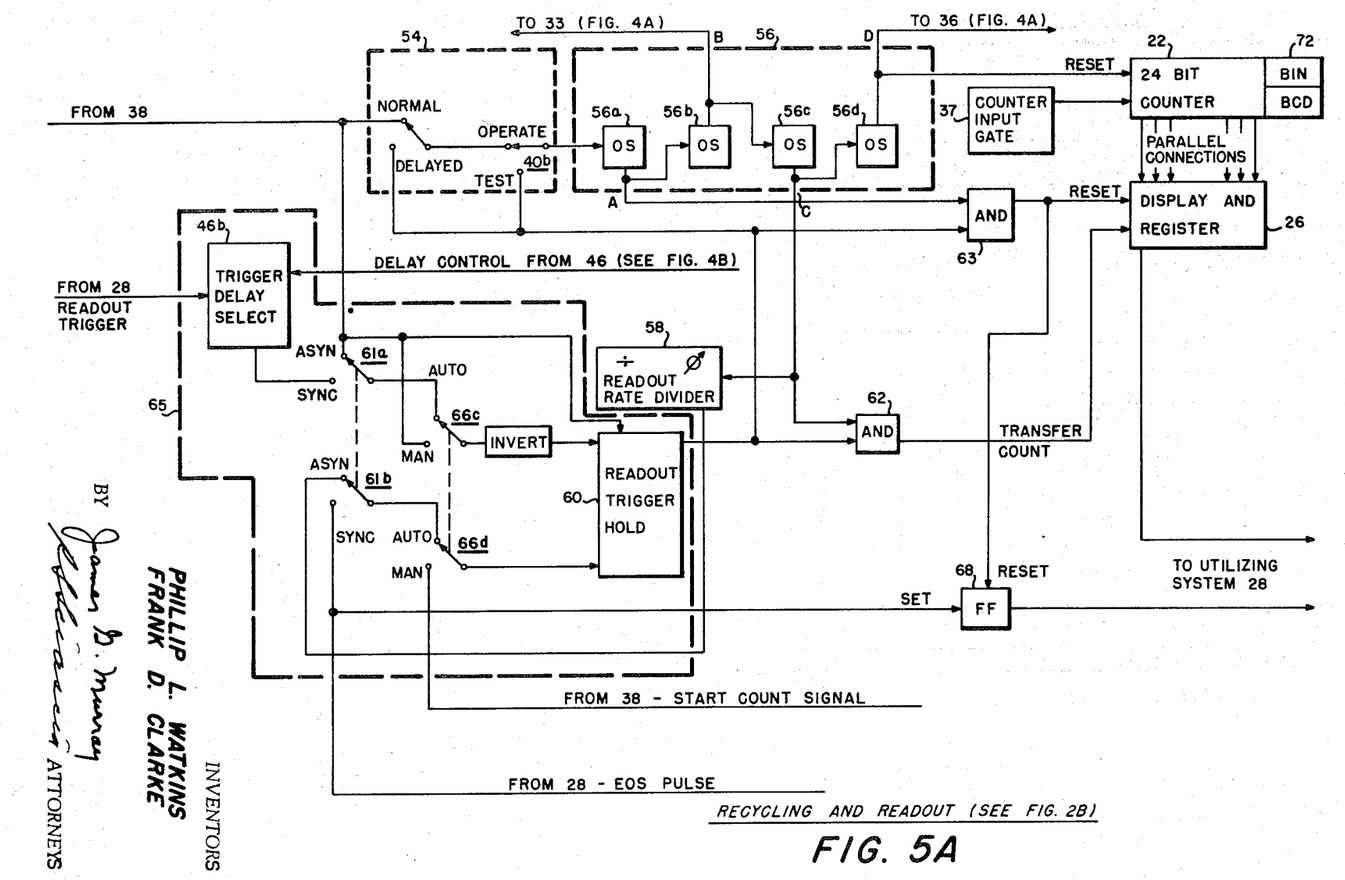
Figure 5B:
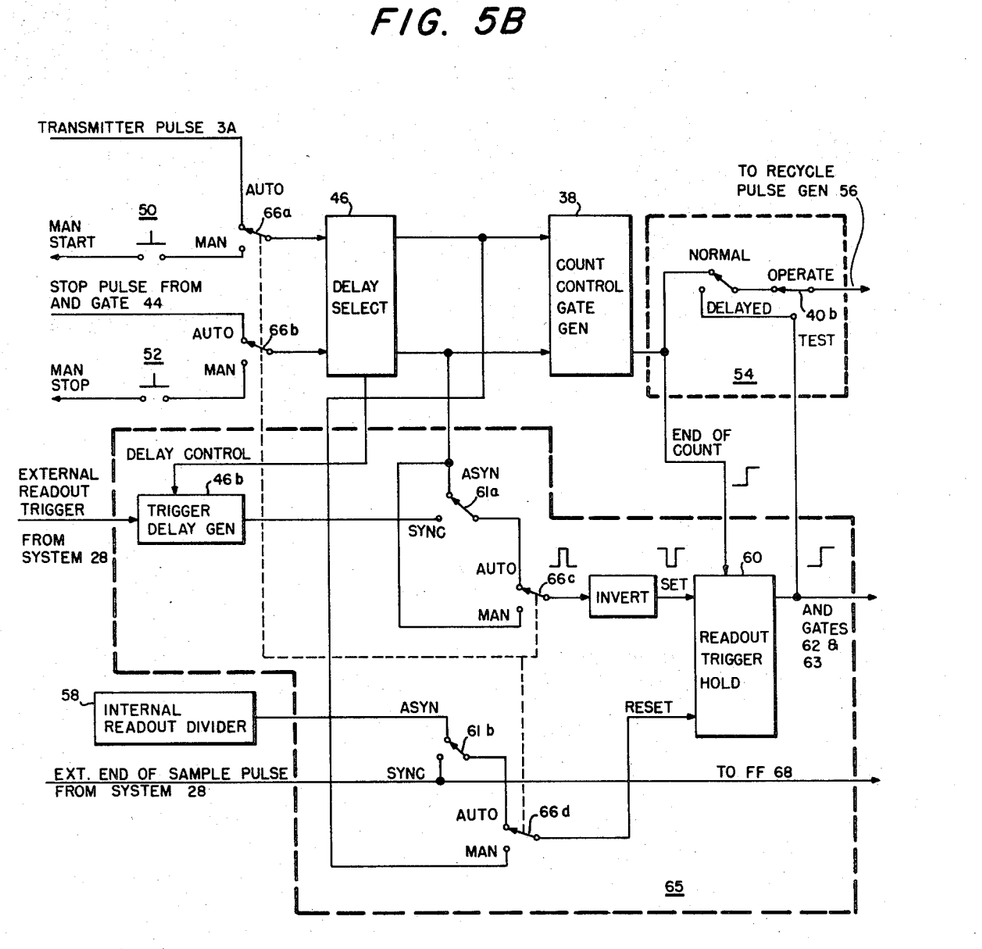

FIGS. 2B, 5A and 5B are functional block and circuit diagrams which show in some detail the recycling and readout aspects of the invention.

Although the stop count pulse output of delay 46 is normally used, in the different modes of operation of the invention it may be desirable to synchronize data readout from an external source selected by the Recycle Trigger Select unit 54 to trigger the Recycle Pulse Generator 56. This generator sequentially produces four pulses identified as A, B, C and D which are illustrated in FIG. 3.

As shown in FIG. 2B, Pulse A, which occurs immediately following the arrival at generator 56 of the trigger pulse from Recycle Trigger Select unit 54, acts through Reset Gating unit 63 to reset the Display and Register 26. Unit 63 is also under the control of Readout Trigger Select unit 65 which functions to select the desired trigger to control Display and Register unit 26.

Pulse B from generator 56 is connected, as previously described, to reset the Selected Count Hold flip-flop 33 (FIG. 4A).

Pulse C from generator 56 is applied to the adjustable Readout Countdown unit 58 that is typically a pulse rate dividing circuit, of which many types are well known. Dividing circuit 58 produces one pulse, which is applied to Readout Trigger Select unit 65 for every one, two, three or more Pulses C (as desired). Pulse C is also applied to Readout Gating unit 62, which is also controlled by the output of the Readout Trigger Select unit 65. The output of unit 62 controls the transfer of data from counter 22 to the Display and Register 26 for use by the Utilizing System 28.

Pulse D from generator 56 is used to reset counter 22 and to set the Enable Count unit 36 (FIG. 2A).

Selector unit 65 can be adjusted as desired by the operator so that the data transfer to and reset of Display and Register 26 through gating units 62 and 63 occur either in synchronism with a signal external of the radar set, such as a readout signal from the Utilizing System 28, or with the output of Readout Countdown unit 58 which is a selected submultiple of the frequency of recycle generator 56 and (normally) of the PRF of the radar set 24. Readout Gating circuit 62, after being enabled by the output of Readout Trigger Select unit 65, passes the Pulse C from Generator 56 and thereby energizes the Display Register 26 to display in digital form the count on Counter 22 (i.e. the range of the target under consideration) and makes this count available for display and use by the Utilizing System 28, which as previously described may be any computer or data recording system.

"End of Sample" (EOS) pulses from the Utilizing System 28 and outputs from gating circuit 63 are also applied to Marker Generator 68 which transmits a marking pulse back to the Utilizing System 28 whenever it produces two "Set" signals that are not separated by a "Reset" signal from gating circuit 63. The marking pulse serves as a warning that the Utilizing System is sampling data from register 26 more often than the register is being changed, i.e. that the Utilizing System 28 is redundantly sampling data.

FIGS. 5A and 5B show some of the circuit details which are suitable for use in the functional block diagram of FIG. 2B. As shown in FIG. 5A the Recycle Trigger Select unit 54 which, while normally connected to cause the recycling to be controlled by the end-of-count signal which closes gate 37 (FIG. 4A), can also be selectably connected to receive trigger signals from the Utilizing System 28 through the readout selector 65. This selector, as particularly shown in FIG. 5B, determines the source of the data readout control signal. When Automatic/Manual switch 66 is in the Automatic position, the readout trigger is derived from the stop count pulse output of trigger delay circuit 46 or from the Utilizing System 28 as selected by the switch 61. The selected pulse is inverted so that the positive-going trailing edge will follow the end-of-count enabling signal from generator 38. When using synchronous readout, the external trigger is delayed for an interval of time equivalent to that used in the stop-count trigger line to maintain synchronism. This delay is provided by delay generator 46b as previously described.

The reset trigger for the trigger hold circuit 60 is derived either from the internal readout divider circuit 58 or an end-of-sample pulse from the external (utilizing) system 28, depending on the position of switch 61b. It is noted that there will be no further positive-going transitions of circuit 60 unless there is a reset pulse for every set pulse.

When switch 66 is in the manual mode, the manual stop-count signal effectively becomes the readout trigger and the manual start-count signal effectively becomes an end-of-sample pulse source, hence no additional triggers are required for readout.

The output of Recycle Trigger Select unit 54 is used to trigger the Recycle Pulse Generator 56 which, as shown in FIG. 5A, consists of four serially connected monostable multivibrators or "one-shots." The first one-shot 56a is triggered by the signal from unit 54 and the following one-shots 56b, 56c and 56d are successively triggered by the trailing edge of the signal from its preceding one-shot.

The function of the Recycle Trigger Select Circuit 54 is to either start the counter recycle at the completion of the counting period, as determined by the transition of the control gate generator 38 to its "off" state, or to delay recycling until a readout trigger is received as determined by the positive transition of Readout Trigger Hold unit 60 to its "on" state. Circuit 54 comprises a Normal/Delayed cycle switch and the "b" section of the Test/Operate switch 40. If switch 40 is in the "operate" position either normal or delayed count recycling may be selected. If the stop-count trigger and the data readout trigger are coincident, then there is no difference between normal and delayed cycle operation. If switch 40 is in the Test mode, the count recycle is effectively forced into the delayed mode since there would be no possibility of coincidence between the stop-count pulse and any external readout trigger pulse. In any event, it is noted that the Readout Trigger Hold circuit 60 will accept a "set" trigger only during the "off" period of Count Control Gate Generator 38, hence a readout trigger cannot "foul" a counting operation.

Readout Countdown unit 58 is connected to receive the output of one-shot 56c and consists of a binary counter with switch selectable AND gate to form a pulse rate dividing circuit. The output of one-shot 56c is also connected to the Readout Gating unit 62 which may be an AND gate that also receives an input from the Readout Trigger Selector 65. Unit 65 is triggered "on" either by the end-of-count signal or by the Utilizing System 28, depending on the position of Readout Trigger Selector switch 61. The end-of-sample pulse from the system 28 is connected to Marker Generator 68, which is shown as a flip-flop. The output of AND gate 63 resets both the Display Register 26 and flip-flop 68.

To again briefly summarize, there has been disclosed the recycling and readout portion of the present invention wherein a trigger signal, usually related to the stop count pulse, initiates the generation of a series of sequential control pulses that cause the presentation of a digital indication of target range for display and other utilization and which resets various components preparatory for the next counting cycle. Alternatively, the generation of the sequential control pulse can be initiated by a trigger signal from the utilizing system. A warning of redundant data is provided if the data readout rate exceeds the count cycling rate.

OPERATION

The operation of the invention is by now apparent. In the normal mode of operation, the counter input gate 37 is opened by the transmited radar pulse and thereby allows the signal from stable oscillator 20 to energize counter 22. When this counter reaches a predetermined level, as set into the Selected Count unit 32 and representative of the minimum expected extended target range being investigated, the next reflected pulse received in the radar range gate is allowed to close the gate 37 and stop the counter. This same pulse is also used to initiate the recycling sequence controlled by generator 56 wherein the count (i.e. the range indication of the target) is either synchronously or asynchronously displayed and made available to the utilizing system 28.

Several other modes of operation are possible. The utilizing system 28 can be used to drive the recycling and readout, in which event the marker generator 68 provides a warning that redundant data is being obtained if the sampling rate is faster than the count cycling rate. A mode of internal testing is also provided by the use of switch 40 whereby both the range correction set by the Delay Selection circuit 46 and the setting of the internal Select Count unit 32 can be verified. Manually operated momentary switches are also provided whereby start and stop count pulses can be produced as desired to check count cycling and readout operation without external signals.

DESCRIPTION OF COUNTER

As previously mentioned, Utilizing System 28 may be a computer of the type which would require that the range indication, i.e. the counter output, be in the binary code. Alternatively, it is contemplated that system 28 can be any of the well known and commerically available data processing and plotting systems which require a binary coded decimal (BCD) input. To make the invention compatible with system which require either binary or BCD inputs, the counter 22 includes unique circuitry which allows the counter to be operated in either the binary or BCD mode by selectably positioning the switch 72 which is merely shown in FIGS. 4A and 5A and is in FIG. 6 illustrated in connection with the unique circuitry of the counter.

Figure 6:
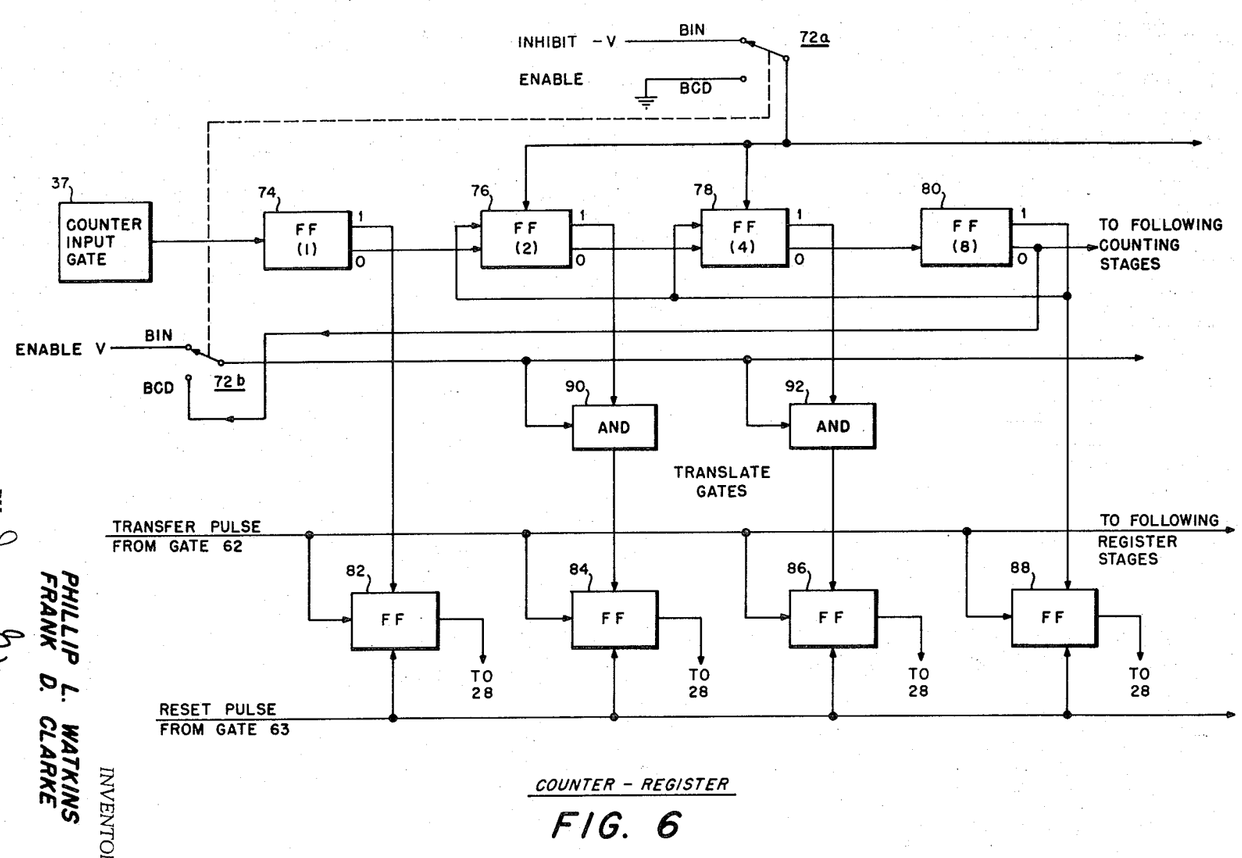
FIG. 6 shows the unique data processing circuits of the invention whereby the data output is available either in binary code or in binary coded decimal form.

FIG. 6 is a partial illustration of counter 22 and shows the circuitry of the first 4 bit stages of the 24 bit stages which counter 22 contains. In the binary mode the 4 bits shown have a counting capacity of 15 units and in the BCD mode of 9 units before all bit positions return to zero. The reader will recognize that the 24 bit counter 22 includes 5 other groups of 4 bit stages identical to the 4 bit stages illustrated so that the complete counter therefore has a binary code counting capacity of $2^{24}-1$ and a BCD mode capacity of $10^6-1$.

In FIG. 6 the Counter Input Gate 37 is shown as energizing counting stages 74, 76, 78 and 80 (and the 20 following counting stages which are not shown). When the switch 72, which includes two mechanically connected portions 72a and 72b, is connected in the binary mode, the counting stages function in the well known and entirely conventional manner of serially connected flip-flops. The counter stages 74, 76, 78 and 80 are connected in parallel to storage stages or flip-flops 82, 84, 86 and 88, which can be a part of Display and Register 26. Upon the arrival of a transfer pulse from gate 62 the binary count is read into Register 26 for display and use by Utilizing System 28. The translate gates 90 and 92, shown as AND gates, are connected between counting stages 76 and 78 and the storage flip-flops 84 and 86 and function merely to transfer without modification the condition of counting stages 76 and 78 to the storage flip-flops 84 and 86 when switch 72b is connected in the binary mode position.

When switch 72 is in the BCD mode position, the counter 22 operates in the same manner as in the binary mode up to a count of seven. Switch 72a places an enabling signal on counting stages 76 and 78 to receive a feedback trigger from the "one" state of counting stage 80. On the eighth pulse into the counter 22, the positive-going transition of the one output of stage 80 triggers the stages 76 and 78 to the one state. Hence, after the eighth pulse, counting stages 76, 78 and 80 are in the "one" state and stage 74 is in the "zero" state. Also, when the switch 72 is in the BCD mode position, the one state output of counting stage 80 (for a count of 8 or 9) will act through switch 72b and cause AND gates 90 and 92 to be blocked. As a result, the storage flip-flops 84 and 86 will be in the zero state regardless of the states of counting stages 76 and 78. It will be realized that when the stage 80 returns to the zero state, AND gates 90 and 92 are not blocked and the states of counting stages 76 and 78 are passed without modification to storage flip-flops 84 and 86.

Figure 7:
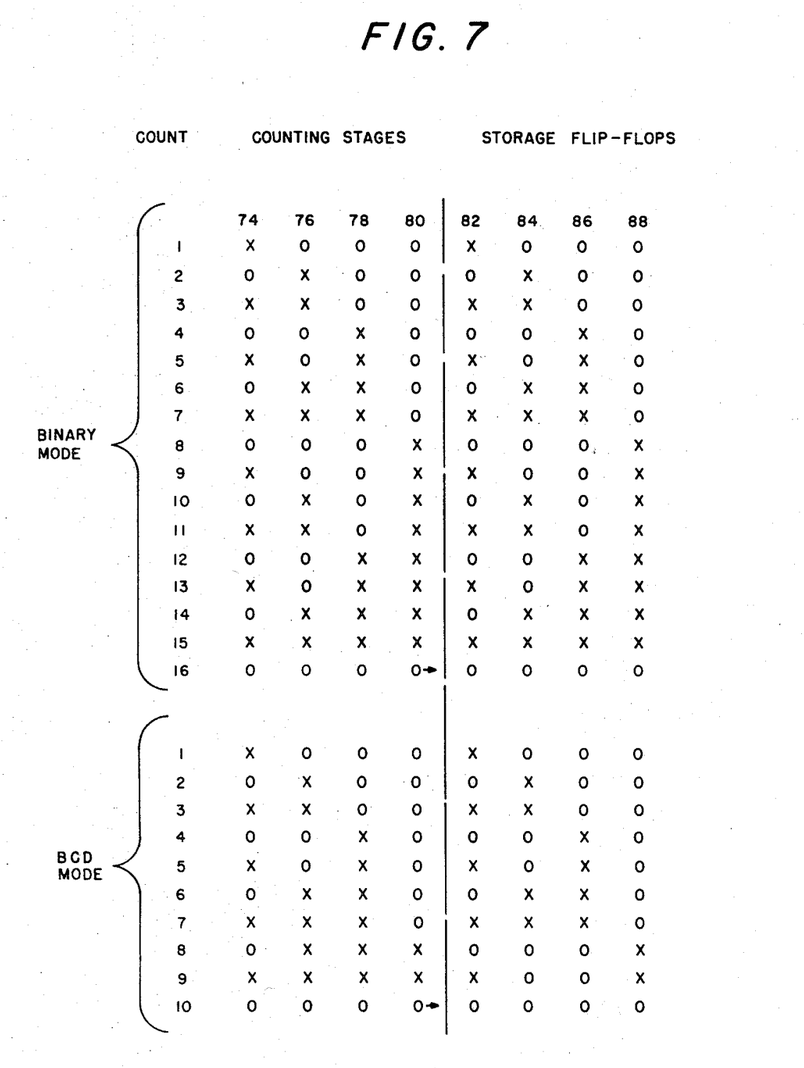
FIG. 7 is a counting diagram which is helpful in understanding the operation of the circuits of FIG. 6.

The operation of the circuit of FIG. 6 will be more easily understood in connection with the counting diagram of FIG. 7. From this figure it can be seen that when counter 22 is operating in the binary mode the counting stages 74, 76, 78 and 80 count in an entirely conventional (binary code) manner and send a signal forward to the next counting stage on the count of 16. The states of the storage flip-flops 82, 84, 86 and 88 are reflective, for all counts, of the condition of the counting stages.

It is apparent from FIG. 7 that when counter 22 is operating in the BCD mode, the first seven counts produce the same condition in the counting stages 74, 76, 78 and 80 and in the storage or register stages 82, 84, 86 and 88 as when the counter 22 is operating in the binary mode. However, on the count of 8 the counting stages 76 and 78, after being momentarily in the zero state, return to the one state because of the combination of signals applied to these stages by the counting stage 80 and the switch 72a. Further the storage stages 84 and 86 are in the zero state because the AND gates 90 and 92 are closed by the blocking signal received through switch 72b from the zero side of the flip-flop 80. The count of 9 only changes the counting stage 74 and the associated storage flip-flop 82 to the one state; the other stages being unchanged. On the count of 10, the counting stages 74, 76, 78 and 80 all change to the zero state and stage 80 sends forward a "carry" signal to the next counting stage. The storage flip-flops 82 and 88 also change to the zero state.

It will now be apparent that a counter has been disclosed which will selectably count in either binary code or BCD. The disclosed unique circuitry which allows the choice of counting mode includes a plurality of serially connected flip-flop counting stages and associated translate gates and storage flip-flops. In the binary mode the counting stages and storage flip-flops count in the conventional manner. In the BCD mode the counter is effectively separated into 4 bit segments with the one and zero outputs of the fourth bit counting stage in each segment being connected to control the second and third bit counting stages and translate gates to produce the desired BCD in the storage flip-flops.

Obviously, in disclosing the invention, many necessary, but conventional, matters, such as buffer stages, fuses, circuit details, etc. were omitted from the circuit diagrams of FIGS. 4A, 4B, 5A, 5B and 6. It is mentioned merely for informative purpose that in the embodiment of the invention actually built and tested at Randle Cliff, many of the components were procured as modules commercially constructed according to the National Bureau of Standards preferred circuits. This embodiment also included the well known feature whereby the counts for a predetermined number of count cycles could be accumulated in the counter 22 prior to readout to register 26. These and the many other details not herein described, are clearly within the routine comprehension of a person skilled in radar design and are not a part of the disclosed inventive concept.

It is, of course, by now apparent that what has been disclosed is an embodiment of the inventive concept of a multi-mode radar range measuring system that is energized by a very stable oscillator and which has the capability for allowing test or normal operation, normal or extended range operation, control of data use and display either by the radar system internal signals or by the data utilizing system with digital range indication either in binary code or in binary coded decimals.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A system for accurately measuring the time between two events comprising:
   a stable oscillator which continuously generates high frequency signals;

time indicating means for counting said oscillator signals and for selectably indicating said count in either binary code or in binary coded decimals and gating means connected between said oscillator and said time indicating means and controlled by the first of said two events to pass said oscillator signals to said time indicating means and controlled by the second of said two events to block said oscillator signals from said time indicating means.

2. A time measuring system as set forth in claim 1 wherein said time indicating means is reset by said second event.

3. A time measuring system as set forth in claim 1 wherein said time indicating means is a counter which includes:
   a plurality of two condition counting stages connected in series;
   a plurality of two condition storage stages individually operatively associated with an individual counting stage and
   connecting circuitry means including a mode switch, said connecting circuitry means interconnecting said plurality of counting stages and said plurality of storage stages in such a manner as to cause said plurality of storage stages to indicate a count either in binary code or in binary coded decimals according to the position of said mode switch.

4. A time measuring system as set forth in claim 3 wherein said counter is reset by said second event.

5. A counter which indicates the number of things counted in either binary code or in binary coded decimals comprising:
   means to energize the counter for each thing counted;
   indicating means adaptable to indicate said number of things counted in either binary code or in binary coded decimals and
   connecting means including a mode control, said connecting means interconnecting said energizing means and said indicating means in such a manner as to cause said indicating means to indicate said number of things counted in either binary code or in binary coded decimals according to the position of said mode control.

6. An electronic counter for counting the number of cycles in an input signal and for indicating said count in either binary code or in binary coded decimals and comprising:
   a plurality of two condition counting stages connected in series, the first of said series connected counting stages being connected to receive said input signal to be counted;
   a plurality of two condition storage stages individually operatively associated with an individual counting stage and
   connecting circuitry means including a mode switch, said connecting circuitry means interconnecting said plurality of counting stages and said plurality of storage stages in such a manner as to cause said plurality of storage stages to indicate said count either in binary code or in binary coded decimals according to the position of said mode switch.

7. An electronic counter as set forth in claim 6 wherein said counting stages are flip-flop circuits, said storage stages are flip-flop circuits and said connecting circuitry means includes AND circuits.

8. An electronic counter for counting the number of cycles in an input signal and for indicating said count in either binary code or in binary coded decimals and comprising:
   a plurality of $n \times 4$ (where $n$ is an integer) two condition counting stages connected in series, the first of said series connected counting stages being connected to receive the input signal to be counted;
   a plurality of two condition storage stages equal in number to said plurality of counting stages, said storage stages being individually operatively associated with an individual counting stage;
   first gating means connected between each $4n$ plus two (where $n$ equals 0, 1, 2, 3, 4, . . . ) series connected counting stages and said individually operatively associated storage stage;
   second gating means connected between each $4n$ plus three (where $n$ equals 0, 1, 2, 3, 4, . . . ) series connected counting stages and said individually operatively associated storage stage;
   a mode switch and
   connecting circuitry means interconnecting said plurality of counting stages, said plurality of storage stages, said first and second gating means and said mode switch
   whereby said plurality of storage stages indicates said count either in binary code or in binary coded decimals according to the position of said mode switch.

9. An electronic counter as set forth in claim 8 wherein said counting stages are flip-flop circuits, said storage stages are flip-flop circuits and said first and second gating means are AND circuits.

10. An electronic counter for counting the number of cycles in an input signal and for indicating said count in either binary code or in binary coded decimals and comprising:
    a mode switch having a binary code position and binary coded decimal position;
    a plurality of identical, series connected, segments, each segment including:
       four two condition counting stages connected in series, the first counting stage in the first of said segments being connected to receive the input signal to be counted and the first counting stage in the other of said segments being connected to the output of the fourth counting stage in the preceding segment;
       four two condition storage stages, said storage stages being individually operatively associated with an individual counting stage;
       gating means connected between the second and third of said counting stages and said individually operatively associated storage stages and
       connecting circuitry means interconnecting said counting stages, said storage stages, said gating means and said mode switch
    whereby said storage stages indicate said count either in binary code or in binary coded decimals according to the position of said mode switch.

11. An electronic counter as set forth in claim 10 wherein in each segment said second and third counting stages and said gating means are controlled in part by the condition of said fourth counting stage and in part by the position of said mode switch.

12. An electronic counter as set forth in claim 11 wherein said counting stages are flip-flop circuits, said storage stages are flip-flop circuits and said gating means are AND circuits.

13. An electronic counter as set forth in claim 12 which further includes means for resetting the counter.

14. An electronic counter as set forth in claim 11 wherein:
    when said mode switch is in said binary code position, in each segment both said four counting stages count and said four storage stages indicate in conventional binary code the fifteen signals received either as said input signal to be counted or as the output of the preceding segment and on the sixteen count reset to zero position and send a signal forward to the next segment and
    when said mode switch is in said binary coded decimal position, in each segment both said four counting stages count and said four storage stages indicate in conventional binary code the first seven signals received either as said input signal to be counted or as the output of the preceding segment and on the eighth and ninth received signals said counting stages are controlled by the condition of said fourth counting gate and said mode switch to be respectively in the conventional binary code fourteen and fifteen count and said storage stages and gating means are controlled by said condition of said fourth counting gate and said mode switch so that said storage stages are in the conventional binary code eight and nine count and on the tenth signal both said counting and storage stages return to zero position and a signal is sent forward to the next counting segment.

15. An electronic counter as set forth in claim 14 wherein said counting stages are flip-flop circuits, said storage stages are flip-flop circuits and said gating means are AND circuits.

16. An electronic counter as set forth in claim 15 which further includes means for resetting the counter.

17. A system for accurately indicating the range of a target under radar investigation comprising:
    radar means which provides first and second electrical signals that are separated by a time period representative of the range of said target;
    a stable oscillator which continuously generates high frequency signals;
    range indicating means for counting said oscillator signals and for selectably indicating said count in either binary code or in binary coded decimals and
    gating means connected between said oscillator and said range indicating means and controlled by said first electrical signal to pass said oscillator signals to said range indicating means and controlled by said second electrical signal to block said oscillator signals from said range indicating means.

18. A range indicating system as set forth in claim 17 wherein said range indicating means is reset by said second electrical signal.

19. A range indicating system as set forth in claim 17 wherein said range indicating means is a counter which includes:
    a plurality of two condition counting stages connected in series;
    a plurality of two condition storage stages individually operatively associated with an individual counting gate and
    connecting circuitry means including a mode switch, said connecting circuitry means interconnecting said plurality of counting stages and said plurality of storage stages in such a manner as to cause said plurality of storage stages to indicate a count indicative of range in either binary code or in binary coded decimals according to the position of said mode switch.

20. A range indicating system as set forth in claim 19 wherein said counter is reset by said second electrical signal.

21. A system for very accurately indicating the range of a target under radar investigaiton comprising:
    radar means which provides a first series of electrical signals and a second series of electrical signals, the operatively related individual signals in said first and second series being separated by a time period that is roughly representative of the range of said target;
    calibration means connected to receive said first and second series of electrical signals and to adjustably and selectably delay one or the other of said first or second series of electrical signals so that said operatively related individual signals are separated by a time period that is very accurately representative of the range of said target;
    a stable oscillator which continuously generates high frequency signals;
    counting means for counting said oscillator signals and for providing a plurality of electrical signals which are selectably representative of said count in either binary code or in binary coded decimals;
    gating means connected between said oscillator and said counting means and controlled by said first series of electrical signals to pass said oscillator signals to said counting means and by said second series of electrical signals to block said oscillator signals from said counting means;
    extended range control means connected to receive said second series of electrical signals and connected to receive and be controlled by said plurality of electrical signals provided by said counting means and to block said second series of electrical signals from said gating means until the count in said counting means reaches a selected level and to thereafter pass the next of said second series of electrical signals to said gating means and
    recycling means connected to receive and to be controlled by said next of said second series of electrical signals to make said count available to utilizing means external of said claimed system and to reset said counting means and said extended range control means.

22. A range indicating system as set forth in claim 21 wherein said recycling means includes a pulse generator consisting of a plurality of series connected one-shot circuits, the first of said series connected one-shot circuits being connected to receive and be activated by said next of said second series of electrical signals and the other of said plurality of series connected one-shot circuits being activated by the preceding one-shot circuit.

23. A range indicating system as set forth in claim 21 wherein said counting means includes a counter comprised of:
    a plurality of two condition counting stages connected in series;
    a plurality of two condition storage stages individually operatively associated with an individual counting stage and
    connecting circuitry means including a mode switch, said connecting circuitry means interconnecting said plurality of counting stages and said plurality of storage stages in such a manner as to cause said plurality of storage stages to indicate a count indicative of range in either binary code or in binary coded decimals according to the position of said mode switch.

24. A range indicating system as set forth in claim 21 and further including marking means connected to be under the control of said recycling means and said external utilizing means to produce a warning signal when said external utilizing means is sampling redundant data from said counting means.

25. A range indicating system as set forth in claim 21 wherein said recycling means includes a pulse generator consisting of a plurality of series connected one-shot circuits, the first of said series connected one-shot circuits being connected to receive and be activated by said next of said second series of electrical signals and the other of said plurality of series connected one-shot circuits being activated by the preceding one-shot circuit and
    wherein said counting means includes a counter comprised of a plurality of two condition counting stages connected in series, a plurality of two condition storage stages individually operatively associated with an individual counting stage and connecting circuitry means including a mode switch, said connecting circuitry means interconnecting said plurality of counting stages and said plurality of storage stages in such a manner as to cause said plurality of storage stages to indicate a count indicative of range in either binary code or in binary coded decimals according to the position of said mode switch and
    further including marking means connected to be under the control of said recycling means and said external utilizing means to produce a warning signal when said external utilizing means is sampling redundant data from said counting means.

References Cited

UNITED STATES PATENTS

| | | | |
|---|---|---|---|
| 2,945,221 | 7/1960 | Hinton et al. | 235—155X |
| 3,160,740 | 12/1964 | Mann et al. | 235—155X |
| 3,181,154 | 4/1965 | Henne | 343—13 |
| 3,298,024 | 1/1967 | Böhm | 343—13X |

RODNEY D. BENNETT, Jr., Primary Examiner

M. F. HUBLER, Assistant Examiner

U.S. Cl. X.R.

235—155